UNITED STATES PATENT OFFICE.

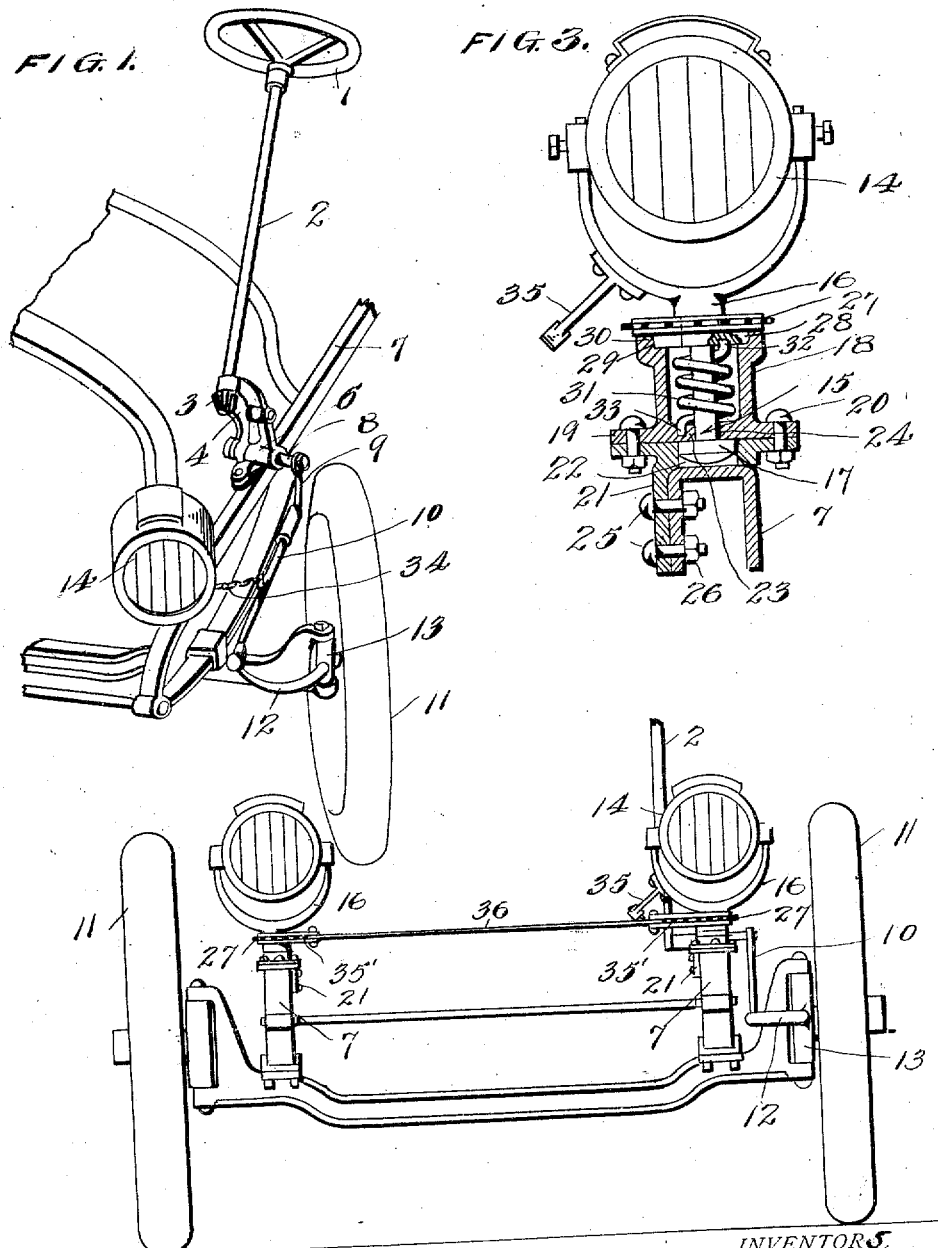

INGVALD M. RASMUSSEN AND GEORGE A. ANDERSON, OF DOYON, NORTH DAKOTA.

DIRIGIBLE HEADLIGHT.

983,766.

Specification of Letters Patent. Patented Feb. 7, 1911.

Application filed October 18, 1910. Serial No. 587,690.

*To all whom it may concern:*

Be it known that we, INGVALD M. RASMUSSEN and GEORGE A. ANDERSON, citizens of the United States, residing at Doyon, in the county of Ramsey and State of North Dakota, have invented certain new and useful Improvements in Dirigible Headlights, of which the following is a specification.

The present invention relates to improved means for automatically moving the headlights of automobiles, so that the lamps will always point and shine in the direction in which the front wheels are turned.

By the utilization of the device hereinafter described the head lights of a moving automobile, which may be turning a street corner or a sharp bend in a road, are caused to shine in the direct line of the front wheels of the vehicle, thus providing for illumination of the road or path in the direct line of travel of the front wheels.

The invention consists in certain novel features of construction and combinations and arrangements of parts as hereinafter set forth in the specification and more clearly defined in the claim.

In the accompanying drawings we have illustrated one example of the physical embodiment of the invention constructed according to the best mode so far devised for the practical application of the principles.

In the drawings, Figure 1 is a perspective view of so much of an automobile and its steering mechanism as is necessary to illustrate the application of this invention. Fig. 2 is an elevation of the front part of an automobile with the present invention embodied therein, and Fig. 3 is a vertical central sectional view showing the means for attaching the lamp to the automobile frame, and one of the operative devices for the lamp.

As will be clearly seen from the drawings, especially Fig. 1, the lamps are turned by the steering mechanism. In Fig. 1 a common type of steering mechanism is illustrated comprising the steer wheel 1, rod 2 and bevel gear 3. These parts are suitably supported and impart a swinging motion, through the gear 3 to the rack or toothed sector 4, which is supported in a journal plate 6 attached to the upper side bar 7 of the automobile frame. An extension 8 of the sector has connected thereto a lever arm 9 which is in turn connected to the draw rod 10 by means of which the wheels 11 are turned through the connections 12 and 13 as will be readily understood.

As illustrated in the drawings the lamps 14 are pivotally supported upon the side bar of the frame 7. Referring particularly to Fig. 3, each lamp has a rod or pintle 15 secured in any convenient manner in the base of the bifurcated bracket 16, and the lower end of the pintle is provided with a head 17. The pintle is supported in the casing or cup 18, which latter is provided with flanges 19 through which are passed the bolts 20 which secure the cup to the bracket 21. An open recess 22 is formed in the bracket 21 for the reception of the pintle head 17 and to form a journal bearing therefor. It will be observed that the lower end of the casing 18 is closed as at 23, a perforation 24 being present for vertically supporting the pintle 15.

The entire device is rigidly secured to the bar 7 by means of bolts 25 and nuts 26.

At the upper end of the pintle or stud shaft 15 is rigidly secured the sprocket wheel 27, having an annular extension 28 upon its under side adapted to seat in the annular recess 29 formed by the shoulder 30 of the casing 18.

From the above description it is evident that the lamp may be rotated within the cup 18. To rotate the lamp in one direction the coiled spring 31 is employed. This spring is coiled about the pintle 15 and has one end embedded in the metal of the sprocket wheel as at 32, and its lower end secured in the bottom of the casing, as at 33.

To rotate the lamp in the reverse direction and against the tension of the coiled spring, the steering mechanism is utilized, and by attaching a chain 34 to the draw rod 10 of the steering mechanism and connecting the other end of said chain to the bracket 35 on the yoke or bracket 16 of the lamp, the drawing or pulling movement of said rod is imparted to the chain 34 thus revolving or rotating the lamp.

While only one lamp has been described, it will be understood of course that the other lamp is similarly equipped with rotating mechanism, and the two sprockets 27 are connected by sprocket chains 35' and draw rod 36.

The particular steering mechanism illustrated herein is merely an exemplifying form, and will be changed or altered on different types of automobiles, but the coiled spring for rotating the lamp in one direction remains unchanged. The means for rotating the lamp against the tension of the spring may be attached to any standard steering mechanism.

Having thus fully described the invention, what is claimed as new is:—

The combination with a pair of yokes each having a pintle pivotally supported upon the frame of an automobile, and a lamp supported in each said yoke, a spring coiled about each pintle and urging its lamp to turn in one direction, a sprocket wheel on each pintle, and connecting means, comprising a sprocket chain extending between said wheels to move the lamps together; and means actuated from the steering mechanism of the automobile for turning the lamps in reversed direction.

In testimony whereof we affix our signatures in presence of two witnesses.

INGVALD M. RASMUSSEN.
GEORGE A. ANDERSON.

Witnesses:
EDWARD F. FLYNN,
CHARLES T. COCKBURN.